E. J. BLOOM.
HOT AND COLD WATER MIXER.
APPLICATION FILED OCT. 25, 1915.
1,207,482.
Patented Dec. 5, 1916.
2 SHEETS—SHEET 1.
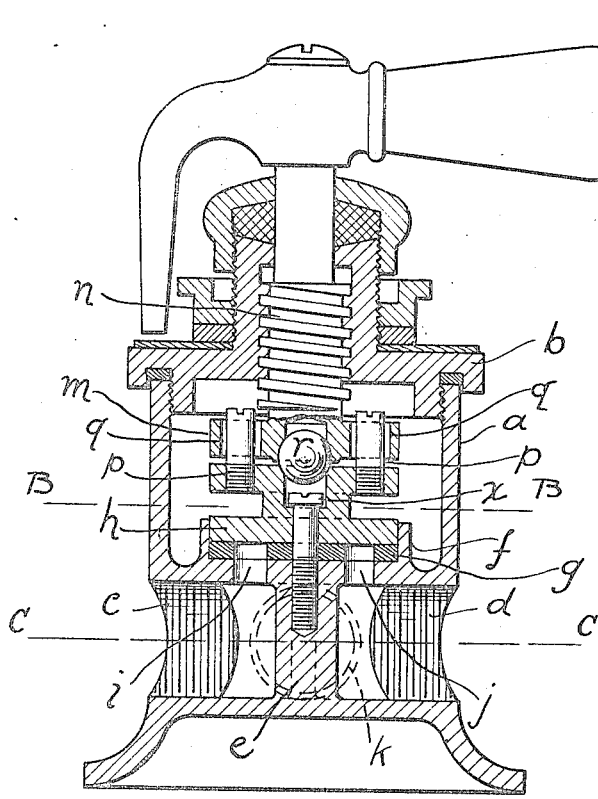
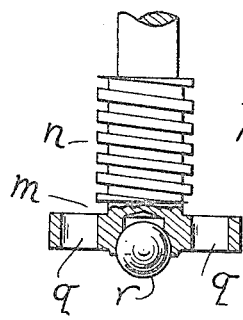
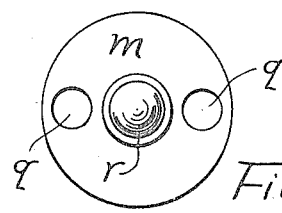
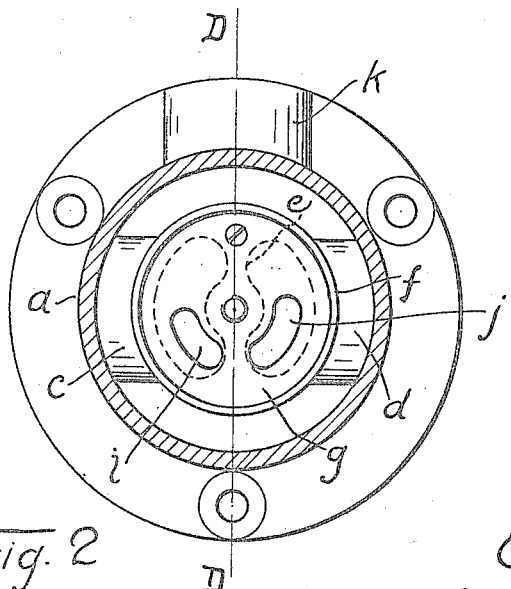
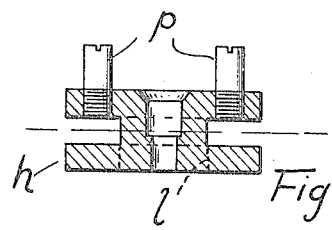
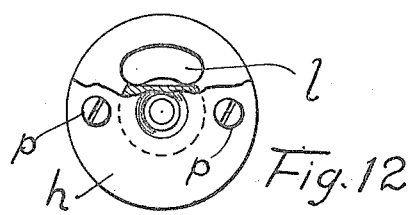
INVENTOR
Edgar J. Bloom
BY Ralzemond A. Parker.
ATTORNEY E. J. BLOOM.
HOT AND COLD WATER MIXER.
APPLICATION FILED OCT. 25, 1915.
1,207,482.
Patented Dec. 5, 1916.
2 SHEETS—SHEET 2.
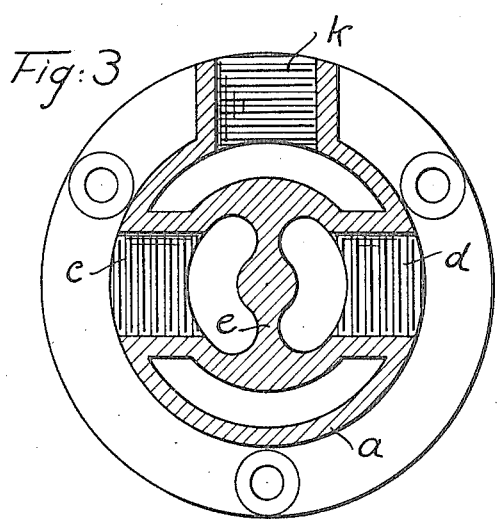
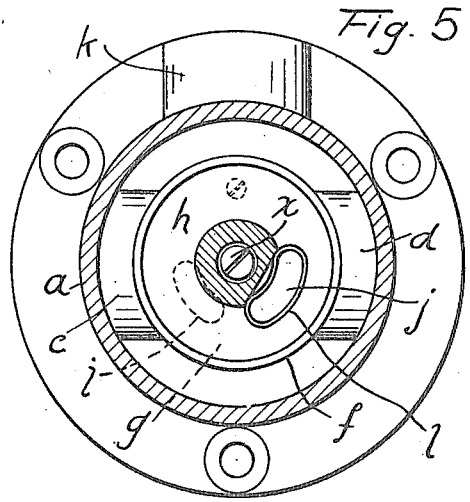
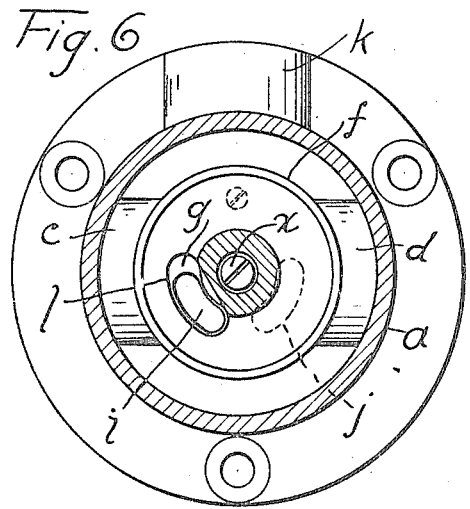
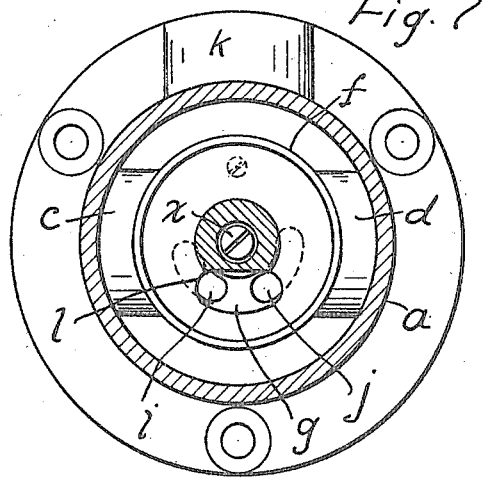
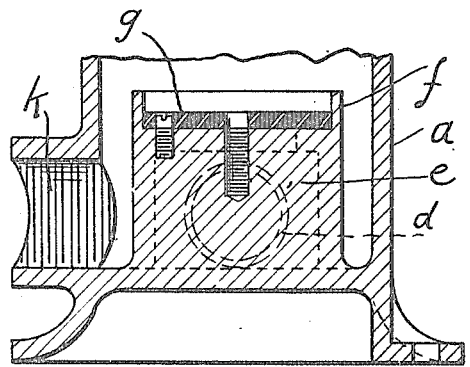
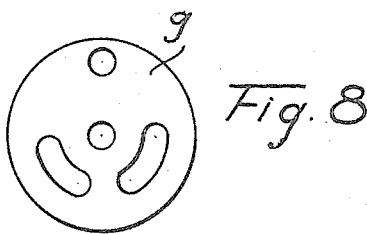
INVENTOR
Edgar J. Bloom
BY Ralzemond A. Parker,
ATTORNEY

UNITED STATES PATENT OFFICE.

EDGAR J. BLOOM, OF TIFFIN, OHIO.

HOT AND COLD WATER MIXER.

1,207,482.

Specification of Letters Patent.

Patented Dec. 5, 1916.

Application filed October 25, 1915. Serial No. 57,646.

*To all whom it may concern:*

Be it known that I, EDGAR J. BLOOM, a citizen of the United States, residing at Tiffin, county of Seneca, State of Ohio, have invented a certain new and useful Improvement in Hot and Cold Water Mixers, and declare the following to be a full, clear, and exact description of the same, such as will enable others skilled in the art to which it pertains to make and use the same, reference being had to the accompanying drawings, which form a part of this specification.

This invention relates to mixers, for mixing hot and cold water. It may be utilized for showers, bath tubs, lavatories, or any other places where it is desirable to mix hot and cold water.

One of the chief advantages of the structure hereinafter to be described is that a differential flow of either hot or cold water can be obtained without in any way mixing the water.

The other advantages which relate to this structure arrangement can best be understood and explained after the structure itself is described, and will, therefore, be reserved for later statement.

In the drawings,—

Figure 1 is a vertical section of the complete mixing valve. Fig. 2 is a cross section on the line B—B but with the valve and packing removed. Fig. 3 is a cross section on the line C—C of Fig. 1. Fig. 4 is a vertical section on the line D—D of Fig. 2. Fig. 5 is a cross section on the line B—B of Fig. 1, showing the valve parts arranged to produce a maximum flow of cold water. Fig. 6 is a similar view showing the valve parts arranged to produce a maximum flow of hot water. Fig. 7 is a similar view showing the valve parts arranged to produce an evenly mixed flow of hot and cold water. Fig. 8 is a detail of a hard rubber packing disk. Fig. 9 is a detail partly in vertical section of the valve-operating screw and its enlarged lower end. Fig. 10 is a bottom view of the same. Fig. 11 is a vertical section of the valve proper. Fig. 12 is a top view of the same with a part of the top portion broken away.

$a$ designates the casting which forms the shell of the mixer, and on one end of this screws a cap $b$. The details of the packing between the cap and the shell and between the cap and the screw stem need no explanation as they are no part of this invention.

The shell or casting is provided with a pair of inlet passage-ways $c$ and $d$ for hot and cold water respectively. These passage-ways are alined but divided at the center by a partition $e$. A ring-boss $f$ is provided in the casting above the passage-ways $c$ and $d$ and projects upwardly into the chamber inclosed by the upper part of the shell $a$. This boss is the side of the valve seat $f$, for within it on the hard rubber packing disk $g$ the valve $h$ seats when pressed down. However, in making this reference character $f$ refer to this ring, it must also be understood as referring to the circular surface provided in the casting just above the passage-ways $c$ and $d$ and upon which rests the packing disk $g$. A pair of segmental slots are provided in the valve seat and are lettered $i$ and $j$. They constitute the hot and cold water ports in the valve seat. Reference to Fig. 8 will show that the packing disk $g$ is provided with similar slots forming the hot and cold water ports. Now, the lower part of the shell incloses an interrupted annular chamber, that is to say, it would be an annular chamber were it not for the interruptions of the inlets $c$ and $d$. Consequently this lower chamber is part of the mixing chamber and also a passage-way for the water from the valve to the outlet port $k$ (see Fig. 3). This outlet port is set 90 degrees from the cold and hot water inlets.

The passage of the water into and out of the mixing chamber has now been traced and it next becomes necessary to understand the working of the valve. This valve $h$ comprises a spool, that is to say, it is shaped like a spool with a pair of annular flanges or heads at each end (see Figs. 1 and 11), forming a deep annular groove at the center. The upper flange or head will be termed the outer head, and the lower flange or head will be termed the inner head for convenience of reference in the claims. The inner head has one approximately segmental slot $l$ (see Fig. 12). This slot forms a passage through the inner head of the spool into the annular groove. Now turning to Figs. 5, 6 and 7, the operation of this valve port $l$ in connection with the hot and cold water ports $i$ and $j$ will be seen and understood. Fig. 5 shows the valve port in complete registry with the cold water port $j$ and consequently a maximum flow of cold water is secured. Any partial registry secures a proportional flow of cold water. Fig. 6 shows the valve port in complete registry with the hot water port and consequently a maximum hot water flow is secured. Any partial registry of the port with the hot water port secures a proportional hot water flow. Fig. 7 shows the valve port in partial registry with both the hot and cold water ports and consequently the mixing is taking place. It is here shown as about half and half, but it will be understood that by moving it to the right, a greater proportion of cold water is secured, and by moving it to the left, a greater proportion of hot water is secured. This makes evident the mixing operation, and it will be evident that a very important function of the arrangement described is that the quantity of the flow of hot or cold water can be regulated without any mixing at all. This is an advantage that does not inhere in all mixers.

The valve is, of course, operated by rotation aided by the water pressure. The rotation is effected by the actuating head $m$ on the end of the screw $n$. The screw is turned by the ordinary lever handle $o$. The outer head of the spool $h$ is provided with a pair of pins $p$ in the form of small screws which screw into it. These pins $p$ engage in perforations $q$ in the actuating head of the screw, and as seen in Fig. 1, the perforations are quite a little larger than the screws themselves, and consequently there is a lost motion connection between the actuating head and the pins $p$ when the rotating effort is communicated from the head to the screws of the valve.

Within the actuating head, exposed on the inner side and at the center, is caged a ball $r$ which performs a double function of serving as an antifriction bearing between the actuator $m$ and the valve $h$ and also locating the contact zone between the valve and the actuator as regards thrust at the center of the valve and within a small area of the valve. Consequently the valve may be cocked slightly, especially in view of the ball contact device, and hence will adjust itself to any irregularity that may be present in the packing disk $g$, as for instance, if the packing disk is slightly thicker on one side than on the other, the valve may be cocked slightly so as to set squarely on the hard rubber packing device and afford a water-tight fit. Now, this arrangement makes possible the use of the hard rubber packing $g$. This hard rubber packing has a very distinct advantage for it not only wears a good deal longer and is a better device to handle, but is very much superior to soft rubber in a joint that comes in contact with hot water.

In Fig. 1 the valve is shown tightly engaging the packing disk $g$ with the port $l$ out of registry with the ports $i$ and $j$. Consequently the cold and hot water are both shut off and nothing flows into the mixing chamber and there can be no leakage or intermixing of hot and cold water if the valve is screwed tightly to the disk. When the opening begins, the lost motion connection between the actuating head and the valve comes into use for the actuating head will be moved slightly before it communicates the rotating effort to the valve. This lifts the actuating head slightly, in the neighborhood of 1/64th of an inch, and consequently the water pressure behind the valve itself makes the valve follow. The valve itself is lifted off from its seat about 1/1000th of an inch (being restrained from further lifting by the screw head $x$) before the turning effort is communicated to it. The result is that the valve is not turned upon its seat when it is tight thereagainst and wear by abrasion is thereby eliminated. At the same time the valve is always close enough to the packing disk to give it a sort of a light wiping action that keeps the immediate seat of the valve free from foreign particles. Further, the lift of 1/1000th of an inch although sufficient to avoid abrasion is not sufficient to allow anything but negligible mixing of the kind of water not desired.

From the above description it will be seen that the valve accomplishes a differential flow of either the cold or the hot water without mixing, and can also mix in any desired proportions; that the rotative effort is communicated to the valve by a lost motion connection to prevent wear on the valve and packing, and finally that the thrust is communicated to the valve by a bearing of such a nature that not only is friction largely eliminated but the valve may adjust itself to any irregularity in its packing.

What I claim is:

1. In a hot and cold water mixer, the combination with a shell provided with hot and cold water inlets and a circular valve seat provided with a hot and a cold water port, of a spool-shaped valve having at its center an annular groove and provided with a port leading through the inner end of the valve to said annular groove, the said port being arranged to register with each of the hot and cold water ports in the valve seat and also with both in combination, a screw for operating the valve provided with an actuating head, and a lost motion connection between the outer end of the valve and the actuating head of the screw adapted for allowing a slight lift of the valve before opening the same.

2. In a hot and cold water mixer, the combination with a shell provided with hot and cold water inlets and a circular valve seat having hot and cold water ports, of a rotary valve provided with a port adapted to register with each of the hot and cold water ports and also with both these ports together, a screw for actuating the valve, means for communicating the rotary effort of the screw to the valve but allowing side shifting of the valve relative to the screw, and a ball thrust bearing at the center of the screw arranged to engage the center of the rotary valve and independent of the driving connections between the screw and the valve.

3. In a hot and cold water mixer, the combination with a shell provided with hot and cold water intakes and a circular valve seat having hot and cold water ports, of a rotary valve provided with a port arranged to register with each of the hot and cold water ports and also with both these ports together, a screw, loose driving connections between the screw and valve, and a ball thrust bearing between the screw and the rotary valve for communicating the thrust of the screw to the valve independently of the said driving connections.

4. In a hot and cold water mixer, the combination with a shell provided with hot and cold water inlets and having a circular valve seat provided with hot and cold water ports, of a rotary valve provided with a port arranged to register with each of the hot and cold water ports and also with both these ports together, a screw for actuating the same, lost motion connections between the screw and the valve for allowing a slight lift of the valve before turning to open, and a ball thrust bearing connecting the screw and the rotary valve at their centers.

5. In a hot and cold water mixer, the combination with a shell having hot and cold water inlets and provided with a circular valve seat having hot and cold water ports, of a spool-shaped valve having an annular recess forming an inner and an outer head for the valve on each end, the said inner head being provided with a port arranged to register with the hot and cold water ports and also with both these ports together, a screw provided with an actuating head having a perforation, a pin on the outer head of the valve arranged to protrude through the perforation in the actuating head but of smaller diameter, and means for allowing only a slight lift of the valve in opening.

6. In a hot and cold water mixer, the combination with a shell provided with hot and cold water inlets and having a circular valve seat provided with hot and cold water ports, of a spool-shaped valve having an annular groove forming inner and outer heads on the two ends of the spool, the said inner head being provided with a port forming a passage into the annular groove and arranged to register with each of the hot and cold water ports and also with both these ports together, a screw for actuating the valve and provided with an actuating head having a perforation, a pin secured to the outer head of the valve and protruding through the perforation of the actuating head but of smaller diameter, means for allowing only a slight lift of the valve in opening, and a thrust ball caged in the actuating head at the center.

7. In a hot and cold water mixer, the combination with a shell provided with hot and cold water intakes, and a circular valve seat having hot and cold water ports, of a hard rubber packing disk located on said valve seat and provided with ports adapted to register with the hot and cold water ports, of a rotary valve seat on said disk, and means for rotating said valve but allowing the same to lift slightly before the actuating effort is communicated to the valve.

8. In a hot and cold water mixer, the combination with a shell provided with hot and cold water inlets and a valve seat having hot and cold water ports, of a hard rubber packing member seated on the circular valve seat and provided with appropriate ports to register with the said hot and cold water ports, a rotary valve seating on said packing, means for actuating the same, including a lost motion connection which allows the lifting of the valve before the actuating effort is communicated to it, and means for restraining the lift of the valve above that necessary to allow rotation without wear.

9. In a hot and cold water mixer, the combination with a shell provided with hot and cold water inlets and provided with a circular valve seat having hot and cold water ports, of a hard packing disk having appropriate ports adapted to register with the said hot and cold water ports, a rotary valve seating on said packing disk, means for rotating the same but allowing sidewise and also axial shifting of the valve relative thereto, and a small area central thrust bearing between the said last mentioned means and the valve for allowing the valve to cock slightly in seating.

10. In a hot and cold water mixer, the combination with a shell provided with hot and cold water inlets and having a circular valve seat provided with hot and cold water ports, of a hard rubber packing disk located on said seat and provided with appropriate ports, a rotary valve seating on said packing disk, an actuating screw, a loose driving connection between the valve and screw and capable of allowing axial movement of the valve relative to the screw, and a ball thrust bearing engaging between the center of the screw and a rotary valve.

11. In a hot and cold water mixer, the combination with a shell provided with hot and cold water inlets and a valve seat having cold and hot water ports, of a rotary valve provided with a port adapted to register with each of the hot and cold water ports and with both, means for rotating the valve including a lost motion connection there-with to allow a slight lifting of the valve before the rotating effort is communicated thereto, and means for restraining the lift of the valve beyond a given point.

12. In a hot and cold water mixer, the combination of a shell provided with hot and cold water inlets and a valve seat having hot and cold water ports, of a rotary valve provided with a port adapted to register with each of the hot and cold water ports and also with both of these ports together, a restraining screw whose head prevents the lift of the valve beyond a given point, and a screw for actuating the valve provided with lost motion and sliding connections between the valve and screw to allow a slight lifting of the valve before the turning effort is communicated thereto.

13. In a hot and cold water mixer, the combination of a shell provided with hot and cold water inlets, a valve seat having hot and cold water ports, a rotary valve provided with a port adapted to register with each of the hot and cold water ports and also with both of these ports together, and means for rotating the valve including lost motion driving connections having a sliding thrust engagement with the valve so as to allow a slight lift of the valve before the rotative effort is communicated thereto.

14. In a hot and cold water mixer, the combination of a shell provided with hot and cold water inlets, a valve seat having hot and cold water ports, a rotary valve provided with a port adapted to register with each of the hot and cold water ports and also with both, means for rotating the valve including lost motion connections and sliding thrust connections adapted to allow a slight lift of the valve before the rotary effort is communicated thereto, and means for restraining the lift of the valve beyond what is necessary to just clear the seat.

15. In a valve for fluid lines, the combination of a valve seat, a disk-like valve, and means for rotating the disk including lost motion connections and sliding connections with the valve which permit lifting of the valve before the rotary effort is communicated thereto.

16. In a fluid conduit valve, the combination of a valve seat, a disk valve, means for rotating the disk valve including lost motion connections and sliding connections with the valve and for allowing a slight lifting of the valve before the rotary movement is communicated to the valve in unseating it, and means for restraining this lifting movement for the purpose of limiting the same for what is necessary for clearance.

In testimony whereof, I sign this specification.

EDGAR J. BLOOM.